(12) United States Patent
Bhanage et al.

(10) Patent No.: US 10,425,958 B2
(45) Date of Patent: *Sep. 24, 2019

(54) ENFORCING STATION FAIRNESS WITH MU-MIMO DEPLOYMENTS

(71) Applicant: ARUBA NETWORKS, INC., Sunnyvale, CA (US)

(72) Inventors: Gautam Bhanage, Sunnyvale, CA (US); Abhijeet Bhorkar, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/436,519

(22) Filed: Feb. 17, 2017

(65) Prior Publication Data

US 2017/0164385 A1     Jun. 8, 2017

Related U.S. Application Data

(63) Continuation of application No. 14/262,641, filed on Apr. 25, 2014, now Pat. No. 9,577,727.

(51) Int. Cl.
*H04W 72/12*     (2009.01)
*H04B 7/0452*     (2017.01)
*H04W 72/04*     (2009.01)
*H04B 7/155*     (2006.01)

(52) U.S. Cl.
CPC ...... *H04W 72/1226* (2013.01); *H04B 7/0452* (2013.01); *H04W 72/0446* (2013.01); *H04B 7/155* (2013.01)

(58) Field of Classification Search
CPC ........ H04B 7/155; H04B 7/0452; H04B 7/24; H04B 17/382; H04B 17/309; H04W 72/0446; H04W 72/1226; H04W 42/242; H04W 88/08; H04W 24/10; H04W 24/02; H04W 72/085; H04W 72/12
See application file for complete search history.

(56) References Cited

U.S. PATENT DOCUMENTS

| | | |
|---|---|---|
| 2007/0173261 A1 | 7/2007 | Priotti et al. |
| 2009/0252099 A1 | 10/2009 | Black et al. |
| 2010/0214992 A1 | 8/2010 | Hart et al. |
| 2012/0243429 A1 | 9/2012 | Nakamori et al. |
| 2013/0265916 A1 | 10/2013 | Zhu et al. |

(Continued)

*Primary Examiner* — Paul H Masur
*Assistant Examiner* — Michael K Phillips
(74) *Attorney, Agent, or Firm* — Hewlett Packard Enterprise Patent Department

(57) ABSTRACT

A non-transitory computer readable medium including instructions which, when executed by one or more hardware processors, causes performance of operations. The operations include: obtaining a first pathloss value for a first data transmitted between a first device and a second device; receiving, at a first component of the first device, a second data to be transmitted to the second device; based at least on the first pathloss value: selecting a first subset of the second data for transmission from the first component to a second component of the first device, where the second component is configured for causing transmission of the first subset of the second data to the second device; transmitting, during a first period of time from the first component to the second component, the first subset of the second data.

20 Claims, 3 Drawing Sheets

(56) References Cited

U.S. PATENT DOCUMENTS

| | | | |
|---|---|---|---|
| 2013/0272211 A1* | 10/2013 | Quan | H04B 7/0452 370/329 |
| 2013/0286865 A1 | 10/2013 | Johansson et al. | |
| 2013/0303177 A1 | 11/2013 | Chen et al. | |
| 2013/0343321 A1* | 12/2013 | Nordstrom | H04W 72/1226 370/329 |
| 2014/0036893 A1 | 2/2014 | Bhanage et al. | |

* cited by examiner

ENFORCING STATION FAIRNESS WITH MU-MIMO DEPLOYMENTS

BACKGROUND

Multiuser multiple input multiple output (MU-MIMO) is a type of wireless technology that is becoming increasingly popular. For example, multiple users may wirelessly connect to a network device using MU-MIMO technology, and this network device may then connect the users to other users and to various services and sources of content on any number of networks. At any given time, the network device may use one or more algorithms to select a subset of the users with whom to exchange packets. However, depending on the algorithm being executed, it is possible that some users will be starved for packets. This has a negative impact on the performance of the overall system.

OVERVIEW

In general, in one aspect, embodiments relate to a non-transitory computer readable medium comprising instructions which, when executed by one or more hardware processors, causes performance of operations. The operations comprise: obtaining a first pathloss value for a first data transmitted between a first device and a second device; receiving, at a first component of the first device, a second data to be transmitted to the second device; based at least on the first pathloss value: selecting a first subset of the second data for transmission from the first component to a second component of the first device, wherein the second component is configured for causing transmission of the first subset of the second data to the second device; transmitting, during a first period of time from the first component to the second component, the first subset of the second data.

In general, in one aspect, embodiments relate to a non-transitory computer readable medium comprising instructions which, when executed by one or more hardware processors, causes performance of operations. The operations comprise: obtaining a first pathloss value for a first data transmitted between a first device and a second device; receiving, at the first device, a second data to be transmitted to the second device; based at least on the first pathloss value: selecting a first subset of the second data for transmission to the second device during a first period of time; transmitting, during the first period of time from the first device to the second device, the first subset of the second data.

Other aspects of the embodiments will be apparent from the following description and the appended claims.

DETAILED DESCRIPTION

Figure 1:
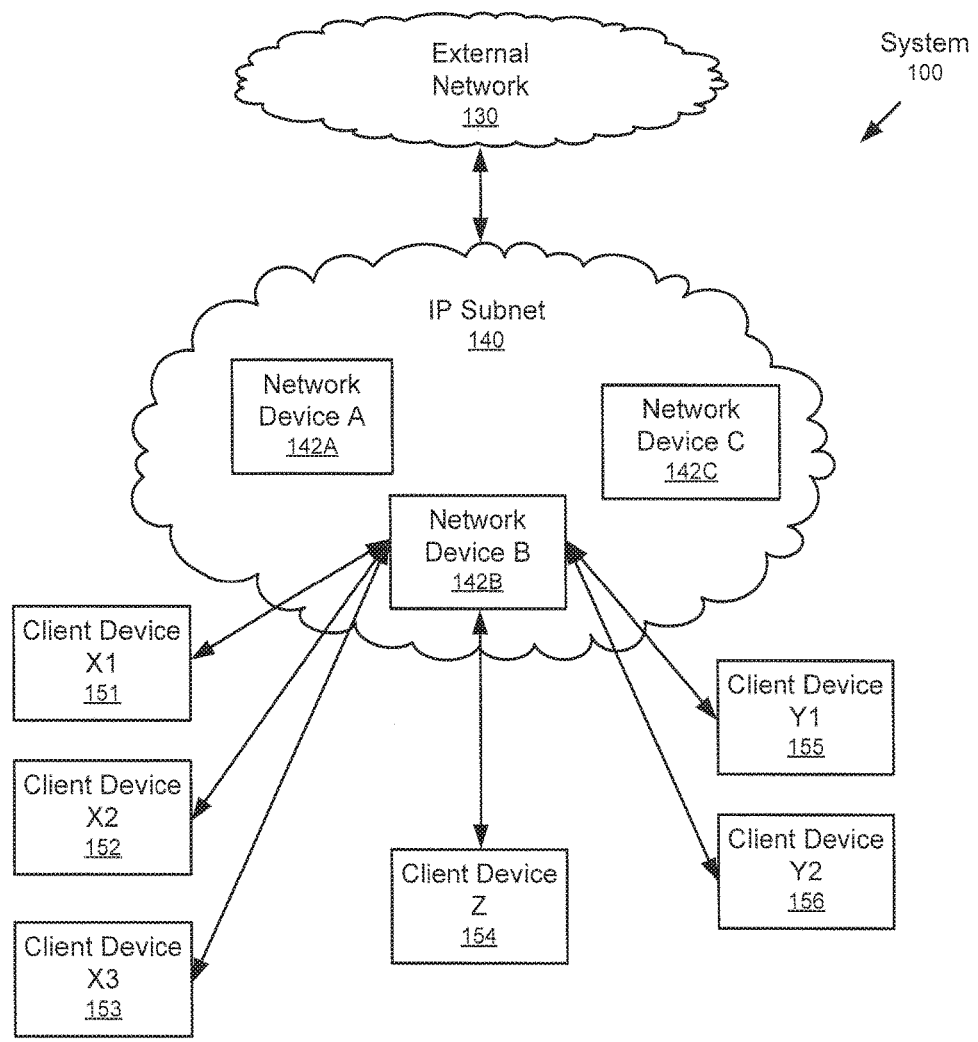
FIG. 1 shows a system in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the invention may be practiced without these specific details. In other instances, well-known features have not been described m detail to avoid unnecessarily complicating the description.

In general, embodiments provide a non-transitory computer readable medium (CRM), a system, and a method for operating a network device connected to multiple client devices using a MU-MIMO technology. Specifically, the pathloss (or any other link conditions) and/or other wireless metrics between the network device and each client device are obtained. Then, an airtime for each client device is calculated using the pathloss (or any other link conditions) and/or other wireless metrics. These airtime values may be refreshed periodically. Moreover, these airtime values are used to control the rate at which data (e.g., packets) for each client device are submitted to the radio component of the network device for transmission using the MU-MIMO technology. Excess data (i.e., data for a client device in excess of the permitted rate) may be discarded/dropped or stored (i.e., delayed) for future submission to the radio component.

FIG. 1 shows a system (100) in accordance with one or more embodiments. As shown in FIG. 1, the system (100) has several components including multiple client devices (e.g., Client Device X1 (151), Client Device X2 (152), Client Device X3 (153), Client Device Z (154), Client Device Y1 (155), Client Device Y2 (156)), an internet protocol (IP) subnet (140), and an external network (130). The IP subnet (140) effectively connects the client devices (151-156) to the external network (130). The external network (130) may be the Internet while the IP subnet (140) may be the local network of a corporate campus, an academic institution, a personal residence, a retail establishment, etc. The external network (130) and the IP subnet (140) may be of any size and include wired and/or wireless segments. Each of these components (130, 140, 151-156) is discussed below.

In one or more embodiments, the external network (160) includes one or more servers (e.g., a web server) (not shown). These servers may be configured to provide any number of services and any type of content (e.g., web pages). Moreover, these servers are configured to receive requests for services/content, and then serve (i.e., send) the services/content to the requesting computing device (e.g., client device (151-156)). Both the requests and the responses may be transmitted as packets.

In one or more embodiments, each client device (151-156) is a computing system. A client device may be a station. For example, the client device may be a mobile device (e.g., laptop computer, smart phone, personal digital assistant, tablet computer, or other mobile device), desktop computer, server, blade in a server chassis, or any other type of computing device or devices that includes at least the minimum processing power, memory, and input and output device(s) to perform one or more embodiments. The client devices may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor.

In one or more embodiments, each client device (151-156) is a destination of one or more packets. In particular, a client device may execute an application that processes the packets. For example, the packets may be packets of streaming communication (e.g., a video stream, audio stream, or other multimedia stream). By way of another example, packets may be control and management packets like DHCP broadcast packets, Router/Neighbor advertisements. In the example, the client device may include functionality to process the streaming communication and present the streaming to a user viewing an output device on the client device. In one or more embodiments, a client device is a source of one or more packets. In particular, a client device may execute an application(s) that generates the packets.

In one or more embodiments, each client device (151-156) is connected to the IP subnet (140), and thus the external network (130), via a network device (e.g., Network Device A (142A), Network Device B (142B), Network Device C (142C)). Specifically, at a particular moment in time, each client device (151-156) may be connected to a single network device (142A-142C). A network device may be connected to any number of client devices. Further, the number of client devices connected to the network device may vary between network devices and over time. As shown in FIG. 1, network device B (142B) connects the client devices (151-156) to the IP subnet (140) and the external network (130). Network device A (142A) and network device C (142C) may connect other client devices (not shown) to the IP subnet (140) and the external network (130).

In one or more embodiment, each network device (142A-142C) is a hardware device that is configured to receive packets (e.g., unicast packets, multicast packets) and transmit the packets to the client devices connected to the network device and roamed client devices of the network device. A network device might also be configured to receive packets from a client device and transmit the packet to the external network (130), to other network devices (142A-142C), and/or to other client devices. Each network device (142A-142C) may correspond to an access point, a controller, a gateway, a switch, a server, or any combination thereof. The network device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor.

In one or more embodiments, network device B (142B) implements a single access point that is connected to the multiple client devices (151-156). Client device X1 (151), client device X2 (152), client device X3 (153), client device Y1 (155), and client device Y2 (156) may be connected to network device B (142B) using MU-MIMO technology. In contrast, client device Z (154) may receive conventional transmission (i.e., non-MU-MIMO) from network device B (142B). In one or more embodiments, network device B (142B) implements multiple virtual access points (VAPs). For example, one VAP is connected to client device X1 (151), client device X2 (152), and client device X3 (153) using MU-MIMO technology. Another VAP is connected to client device Y1 (155) and client device Y2 (156) using the same or different MU-MIMO technology.

In one or more embodiment, each connection between network device B (142B) and a client device (151-153, 155, 156) may be associated with any number of link conditions. For example, each connection has a pathloss (i.e., signal power attenuation) that is a function of the distance between network device B (142B) and the client device, and any intervening media (e.g., air, glass, wood, steel, etc.). As another example, each connection has a delay and a throughput.

Those skilled in the art, having the benefit of this detailed description, will appreciate that at any given time point, network device B (142B) may simultaneously transmit multiple packet streams to a subset of the client devices using MU-MIMO technology. The radio component (i.e., radio chip, radio driver, etc.) of network device B (142B) executes one or more scheduling algorithms that select the subset of client devices for simultaneous transmission. The selection may be based on any number of factors including, for example, power control protocols (e.g., sum-rate-maximization) that have been implemented, airtime fairness protocols that have been implemented, etc. However, those skilled in the art, having the benefit of this detailed description, will also appreciate that the scheduling algorithms may end up un-fairly starving (i.e., not exchanging packets with, or minimal exchange of packets with) some client devices (151-153, 155, 156).

Figure 2:
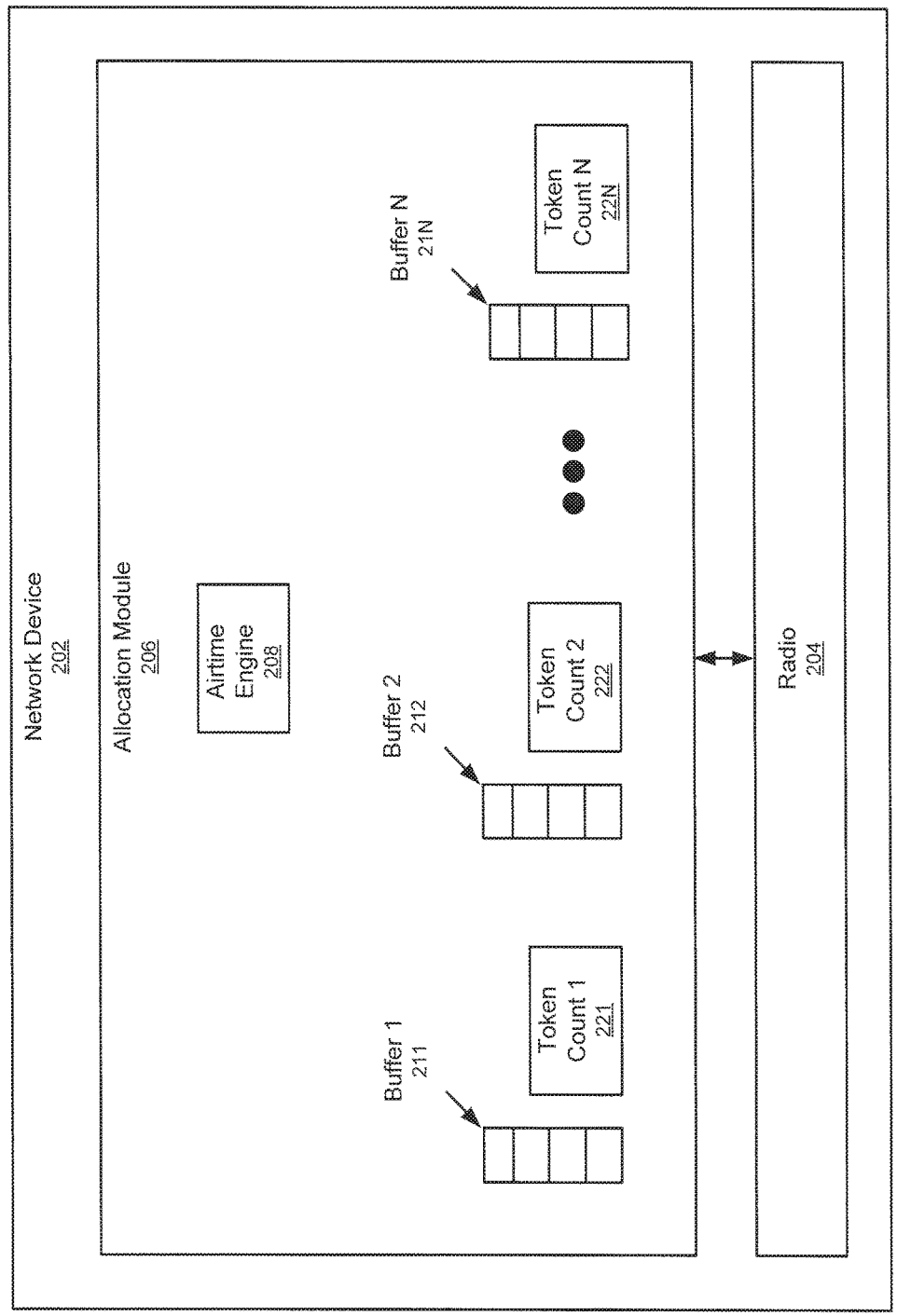
FIG. 2 shows a network device in accordance with one or more embodiments.

FIG. 2 shows a network device (202) in accordance with one or more embodiments. The network device (202) may be essentially the same as network device B (142B), discussed above in reference to FIG. 1. As shown in FIG. 2, the network device (202) has multiple components including an allocation module (206) and a radio (204). Each of these components is discussed below.

In one or more embodiments, the network device (202) includes the radio (204). The radio (204) is configured to exchange (e.g., transmit, receive) packets with one or more client devices (not shown) wirelessly connected to the network device (202). The radio may also communicate with at least one client device using conventional (non-MU-MIMO) transmissions. The radio (204) may also exchange packets with multiple client devices using MU-MIMO technology. Accordingly, the radio (204) may execute one or more scheduling algorithms that select a subset of the connected client devices for simultaneous packet transmission (i.e., simultaneous transmission of different packet streams to different client devices). However, as also discussed above, the scheduling algorithms executing on the radio (204), left unchecked, may end-up starving one or more of the client devices connected to the network device (202).

In one or more embodiments, the network device (202) includes the allocation module (206). The allocation module (206) feeds data (i.e., packet streams) to the radio (204) for transmission to the client devices connected to the network device (202). The allocation module (206) and the radio (204) may be manufactured/programmed by the same manufacturer. The allocation module (206) and the radio (204) may be manufactured/programmed by different manufacturers. Specifically, the radio (204), and the scheduling algorithms executing on the radio (204), may operate independently of the allocation module (206). As shown in FIG. 2, the allocation module (206) has multiple components, including an airtime engine (208), one or more token counts (i.e., Token Count 1 (221), Token Count 2 (222), Token Count N (22N)), and one or more buffers (i.e., Buffer 1 (211), Buffer 2 (212), Buffer N (21N)). Each of these components is discussed below.

In one or more embodiments, the allocation module (206) includes an airtime engine (208). The airtime engine (208) is configured to calculate airtime values. Specifically, the airtime engine (208) is configured to calculate an airtime value for each client device connected to the network device (202) using MU-MIMO technology. These airtime values are used to remove (or at least reduce) unfairness in airtime allocation resulting from non-fair power allocation among the client devices by the radio (204). Specifically, these airtime values are used to control/limit the submission of packets to the radio (202) for transmission to client devices (discussed below). These airtime values may be updated periodically (e.g., every 1 second, every 0.5 seconds, etc.) or at random. Each airtime value may be a function of the link conditions (e.g., pathloss) and/or other wireless metrics between the network device (202) and the client devices. Accordingly, the updated airtime value is a function of the latest link conditions and/or wireless metrics.

For example, pathloss is one possible link condition for determining fairness among client devices. By setting airtime for a client device as inversely proportional to the pathloss between the radio (204) and the client device, it is possible to reduce unfairness in airtime allocation resulting from non-fair power allocation among the client devices by the radio (204). Let the pathloss to client device j be denoted as $P_1$, and let the airtime value for client device j be denoted as $A_j$ $$A_j = \frac{\sum_{i=1}^{N} P_i}{P_j}$$

When this calculation is performed over the entire network device (202), N corresponds to the number of client devices that are connected to the radio (202) by MU-MIMO technology. Further, the value of $A_j$ may be normalized by:

$$A_j = \frac{A_j}{\sum_{i=1}^{N} A_i}$$

This is the target fraction of airtime allocation for client j based on the pathloss information. Although pathloss is one link condition that may be used to calculate airtime values, airtime values may be calculated using one or more of the following link conditions and wireless metrics: target delay per client device; target delay per queue class per client device; achieved delay per queue class per station; target throughput per client device (normalized by the offered load); target throughput per queue class per client (normalized by the offered load); target and/or achieved airtime quotas per VAP; target and/or achieved airtime quotas per queue class per VAP; etc.

If the network device (202) is implementing multiple VAPs, N corresponds to the number of client devices in the same VAP as client device j. Moreover, assuming client device j is located in VAP k, $A_j$ is scaled according to the following:

$$A_{k,j} = A_j \times Q_k$$

where QK is the fraction of the radio (202) airtime that is assigned to VAP k.

In one or more embodiments, the allocation module (206) includes multiple token counts (221, 222, 22N). Specifically, there exists one token count for each client device that is connected to the network device (202) by MU-MIMO technology. A token is a unit of airtime (e.g., 1 ms, 5 ms, etc.). The token count for a client device reflects the quantity of tokens, and thus the quantity of airtime, that has been assigned to the client device. The token count for a client device is calculated based on the airtime value for the client device. Accordingly, the token count for a client device may be updated in response to an update in the airtime value for the client device.

In one or more embodiments, the token count for a client device is calculated by multiplying the total number of tokens by the airtime value for the client device. For example, assume there are three client devices. Moreover, assume the airtime values of 0.5, 0.3, and 0.2, respectively, have been calculated by the airtime engine (208) for the three client devices. If there are 100 tokens to be distributed, the first client device would be allocated (and thus have a token count of) 50 tokens, the second client device would be allocated (and thus have a token count of) 30 tokens, and the third client device would be allocated (and thus have a token count of) 20 tokens. Those skilled in the art, having the benefit of this detailed description, will appreciate that client devices with large airtime values will receive a larger share of the tokens.

As discussed above, the network device (202) receives packets (e.g., unicast packets, multicast packets) and transmits the packets to the client devices. In one or more embodiments, the token count (221, 222, 22N) is used to control/limit/delay the submission of packets to the radio (204) for transmission to the client devices. Specifically, the allocation module (206) receives packets destined for a client device and only forwards/submits the packets to the radio (204) if the token count for the client device is non-zero. As packets are forwarded/submitted to the radio (204) for transmission to the client device, the token count is reduced (i.e., decremented) by the amount of airtime (or tokens corresponding to the airtime) required to transmit the packets to the client device. If the token count reaches zero before all of the packets are submitted to the radio (204), the remaining packets may be discarded or stored in the buffer. Specifically, the remaining packets may be stored in the buffer for the client device until the token count for the client device is updated. In other words, the remaining packets are deliberately delayed until a future time. In one or more embodiments, the stored packets can only be delayed for a pre-determined maximum delay time, at which point they are submitted to the radio (204) regardless of the token value. If the buffer reaches capacity, older packets may be overwritten before newer packets.

For example, assume token count 2 (222) and buffer 2 (212) are associated with client device X (not shown) connected to the network device (202). Further, assume that the network device (202) receives packets destined for client device X. If token count 2 (222) is zero, the received packets may be discarded or stored in buffer 2 (212). However, if token count 2 (222) is non-zero, a subset of the packets may be submitted to the radio (204) for transmission to client device X. Every time a packet is submitted to the radio (204), token count 2 (222) is reduced (e.g., decremented). Specifically, token count 2 (222) is reduced by the airtime required to transmit the submitted packets to client device X. If token count 2 (222) reaches zero before all of the packets for client device X have been submitted to the radio (204), the remaining packets may be discarded or stored in buffer 2 (212). The submission of packets stored in buffer 2 (212) to the radio (204) may resume at some future point when token count 2 (222) is updated/refreshed with a non-zero value. Although embodiments have focused on token counts of zero, any arbitrary number may be used.

Those skilled in the art, having the benefit of this detailed description, will appreciate that although it might not be possible to directly control the scheduling algorithms being executed by the radio (204), it may still be possible to prevent client devices from being starved using the allocation module (206). Specifically, by delaying/withholding packets destined for client devices that are likely to be favored by the scheduling algorithms, and by flooding the radio (204) with packets destined for client devices that are likely to be starved by the scheduling algorithms, it is possible to reduce the likelihood that any client device will be un-fairly starved.

Figure 3:
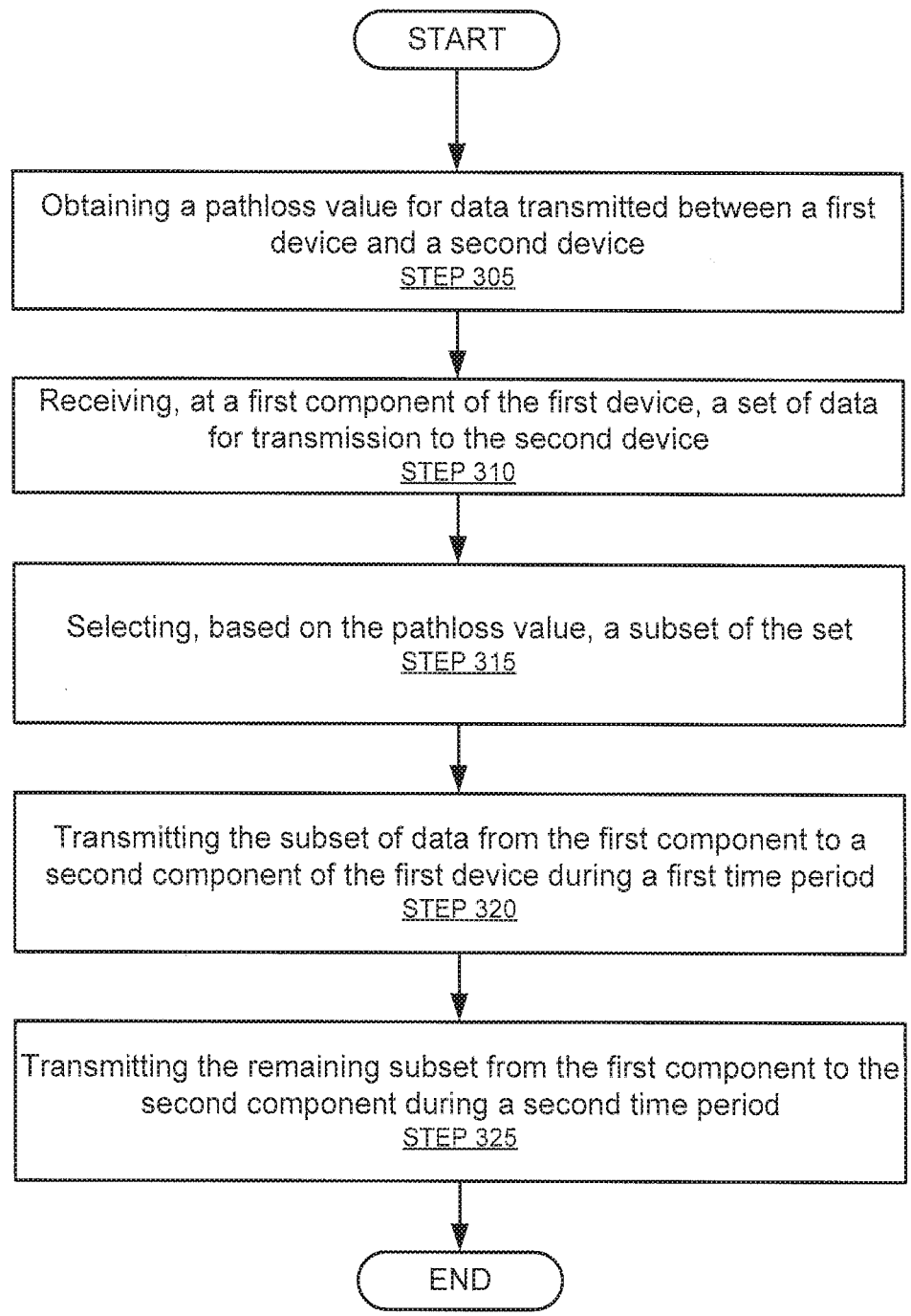
FIG. 3 shows a flowchart in accordance with one or more embodiments.

FIG. 3 shows a flowchart in accordance with one or more embodiments. The process shown in FIG. 3 may be executed, for example, by one or more components (e.g., allocation module (206)) discussed above in reference to FIG. 2. One or more steps shown in FIG. 3 may be omitted, repeated, and/or performed in a different order among different embodiments. Accordingly, embodiments should not be considered limited to the specific number and arrangement of steps shown in FIG. 3.

Initially, a pathloss value for data (e.g., packets) transmitted between a first device and a second device is obtained (STEP 305). The first device may be a network device (e.g., access point) in an IP subnet, while the second device may one of many client devices (e.g., smartphone, tablet PC, etc.) connected to the network device. Moreover, the first device may be simultaneously transmitting different packet streams to a subset of the client devices using MU-MIMO technology. The pathloss value may be reported to the first device by other network devices in the IP subset. Additionally or alternatively, the signal-to-interference-plus-noise ratio (SINR) obtained from beacons may be used with transmission power for broadcast packets as an approach for determining the pathloss value.

In STEP 310, a set of data (i.e., packets) for transmission to the second device is received by a first component of the first device. The first device may include an allocation module (i.e., a first component) and a radio (i.e., a second component). The set of data may have been generated by a server in a network connected to the first device. The set of data may be sent to the first device from another network device in the same IP subnet as the first device. The set of data may correspond to streaming video, streaming audio, e-mail, or any other class/type of data.

In STEP 315, a subset of the set of data is selected based on the pathloss value. Specifically, the size of the subset is inversely proportional to the pathloss value. Further, the size of the subset may also be a function of the pathloss values between the first device and the other client devices. Further still, the size of the subset may be determined using a token count in the first component for the second device (discussed above). The remaining portion of the set may be discarded or stored in a buffer within the first component.

In STEP 320, the subset of data is transmitted from the first component to the second component of the first device during a first time period. The second component may then transmit the subset of data to the second device. The remaining portion of the set of data may be in stored in a buffer for at least part of the first time period. The end of the first time period and the start of a second time period may be triggered by the updating of token counts.

In STEP 325, the remaining subset (i.e., the remaining portion of the set of data) is transmitted from the first component to the second component of the first device. The second component may then transmit the portion of data to the second device.

Those skilled in the art, having the benefit of this detailed description, will appreciate that the steps in FIG. 3 may be repeated for all client devices connected to the first device.

Embodiments may have one or more of the following advantages: the ability to indirectly control the scheduling algorithms of a radio in a network device using MU-MIMO technology; the ability to use pathloss and/or other link conditions and wireless metrics to reduce the likelihood a client device will be unfairly starved of packets; the ability to use token counts to control/limit/delay packets from being submitted/forwarded to a radio; the ability to calculate token counts from airtime values, and the airtime values from the pathloss values; etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A network device comprising: a hardware processor; and a memory communicatively coupled to the hardware processor, the hardware processor to perform operations comprising:
    obtaining a pathloss value for a first data transmitted between the network device and each of a subset of a plurality of client devices that are associated with the network device and connected to a particular virtual access point (VAP);
    calculating a target fraction of airtime allocation corresponding to the particular VAP based on a ratio of an airtime value corresponding to the subset of the plurality of client devices to a total airtime value corresponding to the plurality of client devices, the airtime value being inversely proportional to the pathloss value;
    receiving, at the particular VAP of the network device, a second data to be transmitted to a second device in the subset of the plurality of client devices;
    selecting a first subset of the second data for transmission to a radio of the network device such that transmission of the first subset of the second data from the radio to the second device uses less than the target fraction of airtime allocation for the particular VAP;
    transmitting, during a first period of time from the particular VAP to the radio, the first subset of the second data destined to the second device.

2. The network device of claim 1, wherein selecting the first subset of the second data for transmission comprises delaying transmission of a second subset of the second data from the particular VAP to the radio until a second period of time subsequent to the first period of time.

3. The network device of claim 2, wherein delaying transmission of the second subset of the second data comprises delaying transmission of the second subset of the second data up to a maximum delay time.

4. The network device of claim 1, wherein selecting the first subset of the second data for transmission comprises dropping a second subset of the second data without transmission from the particular VAP to the radio.

5. The network device of claim 1, wherein calculating the target fraction of airtime allocation corresponding to the particular VAP is further based on a target delay corresponding to the subset of the plurality of client devices connected to the particular VAP.

6. The network device of claim 1, wherein calculating the target fraction of airtime allocation corresponding to the particular VAP is further based on a target throughput corresponding to the subset of the plurality of client devices connected to the particular VAP.

7. The network device of claim 1, wherein selecting the first subset of the second data comprises (a) selecting an amount of the second data for transmission from the particular VAP to the radio, and (b) selecting the first subset of the second data based on the amount of the second data.

8. The network device of claim 1, wherein selecting the first subset is further based on a quota associated with the particular Virtual Access Point implemented by the network device and communicatively coupled with the second device.

9. The network device of claim 1, wherein selecting the first subset is further based on a quota associated with a group of devices comprising the second device.

10. The network device of claim 1, wherein the network device comprises an access point and the second device is a client device.

11. A network device comprising: a hardware processor; and a memory communicatively coupled to the hardware processor, the hardware processor to perform operations comprising:
   obtaining a pathloss value for a first data transmitted between a network device and each of a subset of a plurality of client devices that are associated with the network device and connected to a particular virtual access point (VAP);
   receiving, at the network device, a second data to be transmitted to a second device from the subset of the plurality of client devices;
   calculating a target fraction of airtime allocation corresponding to the particular VAP based on a ratio of an airtime value corresponding to the subset of the plurality of client devices to a total airtime value corresponding to the plurality of client devices, the airtime value being inversely proportional to the pathloss value;
   selecting a first subset of the second data for transmission to the second device during a first period of time such that transmission of the first subset of the second data from the radio to the second device uses less than the target fraction of airtime allocation for the particular VAP;
   transmitting, during the first period of time from the network device to the second device, the first subset of the second data.

12. The network device of claim 11, wherein selecting the first subset of the second data for transmission to the second device comprises delaying transmission of a second subset of the second data from the first device to the second device until a second period of time subsequent to the first period of time.

13. The network device of claim 12, wherein delaying transmission of the second subset of the second data comprises delaying transmission of the second subset of the second data up to a maximum delay time.

14. The network device of claim 11, wherein selecting the first subset of the second data for transmission to the second device comprises dropping a second subset of the second data without transmission from the network device to the second device.

15. The network device of claim 11, wherein calculating the target fraction of airtime allocation corresponding to the particular VAP is further based on a target delay corresponding to the subset of the plurality of client devices connected to the particular VAP.

16. The network device of claim 11, wherein calculating the target fraction of airtime allocation corresponding to the particular VAP is further based on a target throughput corresponding to the subset of the plurality of client devices connected to the particular VAP.

17. The network device of claim 11, wherein selecting the first subset of the second data comprises (a) selecting an amount of the second data for transmission from the network device to the second device, and (b) selecting the first subset of the second data based on the amount of the second data.

18. The network device of claim 11, wherein selecting the first subset is further based on a quota associated with the particular Virtual Access Point implemented by the first device and communicatively coupled with the second device.

19. The network device of claim 11, wherein selecting the first subset is further based on a quota associated with a group of devices comprising the second device.

20. The network device of claim 11, wherein the network device comprises an access point and the second device is a client device.

* * * * *